United States Patent Office 3,644,517
Patented Feb. 22, 1972

3,644,517
PHOSPHINE SUBSTITUTED OXALYL CHLORIDES
Laszlo Joseph Bollyky and Robert Henry Whitman, Stamford, Conn., assignors to American Cyanamid Company, Stamford, Conn.
No Drawing. Original application Sept. 13, 1967, Ser. No. 667,371, now Patent No. 3,442,813, dated May 6, 1969. Divided and this application Nov. 27, 1968, Ser. No. 779,646
Int. Cl. C07f 9/50
U.S. Cl. 260—544 M                                      3 Claims

ABSTRACT OF THE DISCLOSURE

A chemiluminescent reactant complex formed by the reaction of a polycarbonyl halide and a Lewis base, having the following formula:

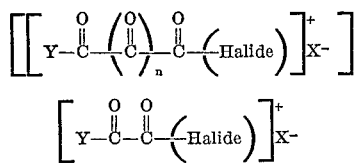

where X is a halide ion and Y is a triphenylphosphine or a trialkylphosphine group.

---

The present application is a division of application Ser. No. 667,371, filed Sept. 13, 1967, now U.S. Pat. No. 3,442,813, issued May 6, 1969.

The present invention relates to novel compositions of matter and reactions for the direct generation of light from chemical energy. By "light" as referred to herein is meant electromagnetic radiation at wavelengths falling between 350 m$\mu$ and 1000 m$\mu$.

The art of generating light from chemical energy, i.e., chemiluminescence, is continually in search of compositions which when reacted substantially improve the intensity and lifetime of light emission. Obviously, improved compositions are constantly in demand for use as signal devices, for area illumination, etc.

The art has known for some time that oxalyl chloride in combination with aqueous (30%) hydrogen peroxide and a fluorescent compound generates a light whose life is very short (on the order of about 8 to 30 seconds) and whose intensity is not exceptional, i.e., whose intensity is of little practical utility. Numerous attempts have been made to improve this chemiluminescent composition and many others similar to it, but with little success.

According to a publication by Edward A. Chandross, the chemiluminescent reaction of oxalyl chloride may be represented as occurring by the following mechanism:

(1)
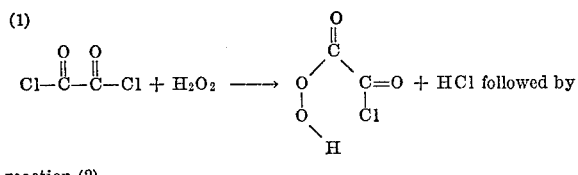

reaction (2)
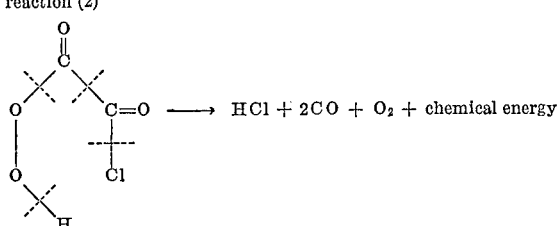

In the above reactions, a cyclic transition structure is formed, followed by a breakdown of the ring into hydrochloric acid, carbon monoxide, oxygen, and chemical energy.

The (1) oxalyl chloride reactant and (2) mechanism of the oxalyl chloride chemiluminescent reaction (as represented by Chandross) is entirely different and distinct from those of the invention disclosed herein, as is discussed at length below.

The mechanisms by which chemiluminescent light may be generated are so poorly understood that it is not possible at present to predict those structures which convey the chemiluminescent property. This is amply illustrated by the phthalhydrazide series of compounds, some of which are chemiluminescent and some of which are not chemiluminescent [See A. Bernanose, Bull. Soc. Chim. France, 17,567 (1950)].

It is an object of this invention to obtain a chemiluminescent composition and a process employing said composition whereby a high efficiency may be obtained in the conversion of chemical energy into light.

Another object is to obtain a chemiluminescent compound which produces a light over an extended period of time.

Another object of this invention is to obtain a chemiluminescent composition which attains a light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of a fluorescent compound will produce chemiluminescent light.

Another object of this invention is to obtain a chemiluminescent reactant by the reaction of a polycarbonyl dihalide-Lewis base complex.

Another object of this invention is to obtain a reaction mixture formed by the reaction comprising a polycarbonyl dihalide-Lewis base complex, a peroxide, fluorescent compound, and a diluent.

We have unexpectedly discovered that the objects of this invention are obtained by admixing a particular complex defined hereafter, a peroxide, a fluorescent compound, and a diluent.

The term "chemiluminescent reactant" as used herein means a mixture which will result in a chemiluminescent reaction when reacted with other necessary reactants in the processes as disclosed herein.

The term "chemiluminescent composition" as used herein means a mixture which will result in chemiluminescence.

The term "admixing" as used herein means "reacting" or sufficiently bringing together component reactants to obtain a chemiluminescent reaction.

The term "peroxide compound" as used herein includes a typical peroxide and also includes compounds which upon reaction produce the peroxide group.

The term "peroxide group", as used herein, represents "HOO—," "ROO—" and

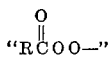

"R" is defined as an alkyl or an aryl hydrocarbon group, substituted or unsubstituted.

The term "hydrogen peroxide compound" includes (1) hydrogen peroxide and (2) hydrogen peroxide-producing compounds.

The term "diluent," as used herein, means a solvent or a vehicle which when employed with a solvent does not cause insolubility.

The term "fluorescent compound" means (1) a compound which is a fluorescer and/or (2) a compound which upon reaction produces a fluorescer compound.

The group of polycarbonyl dihalide-Lewis base complexes within the scope of applicants' invention is represented by the typical formula:

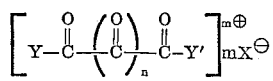

in which Y and Y' are each a Lewis base substituent, providing one of Y or Y' is not a halide group; $n$ is a number less than about 7; and $m$ is a number from 1 to 2, $m$ being 1 when one of Y and Y' is a halide group.

Suitable Lewis base substituents are, for example, as follows:

(1) A pyridine
(2) Substituted pyridines, e.g.:

(A) substituted (1) by an alkyl group: e.g. decyl; pentyl-; ethyl-; methyl- (i.e. picoline); isopropyl-; cyclohexyl-; etc. or (2) by alkyl groups which are substituted further, such as:

(a) by aromatic groups: e:g: triphenylmethyl-, diphenylmethyl-, benzyl-;
(b) by halogen: e:g: chloromethyl-, chloropentyl-, bromobutyl-;
(c) by acetoxy group: e.g. acetoxyethyl-, acetoxydecyl-;
(d) by carbonyl groups: e.g. formylmethyl-, propionylmethyl-;
(e) by carboxyl group: e.g. carboxymethyl-, carboxyethyl-;
(f) by alkoxy group: e.g. ethoxymethyl-, methoxyethyl-;
(g) by amino groups: e.g. dimethylaminomethyl-, dimethylaminoethyl-;
(h) by heterocyclic group: e.g. pyridylethyl-, furylmethyl-, tetrahydrofurylpropyl-;
(i) by sulfo groups: e.g. sulfomethyl-;

(B) substituted (1) by an aryl groups: e.g. phenyl-, naphthyl-, or (2) by aryl groups which are substituted further such as:

(a) by alkyl groups: e.g. tolyl-, ethylphenyl-;
(b) by halogen: e.g. chlorophenyl-, bromophenyl-;
(c) by acyloxy groups: e.g. acetoxyphenyl-;
(d) by carbonyl groups: e.g. formylphenyl-;
(e) by carboxyl groups: e.g. carboxyphenyl-;
(f) by alkoxy groups: e.g. methoxyphenyl-;
(g) by amino groups: e.g. dimethylaminophenyl-, diethylaminophenyl-;
(h) by heterocyclic groups: e.g. pyridylphenyl-, tetrahydrofurylphenyl-;
(i) by sulfo groups: e.g. sulfophenyl-;

(C) substituted by an alkoxy group: e.g. methoxypyridine;

(D) substituted by a carbonyl group: e.g. formylpyridine;
(E) substituted by a carboxyl group: e.g. carboxypyridine;
(F) substituted by an unsaturated group: e.g. vinyl pyridine;
(G) substituted by a sulfo group: e.g. pyridine sulfonic acid;
(H) substituted by a halogen group: epichloropyridine;
(I) substituted (1) by heterocyclic groups: e.g., pyridyl-, furyl-, tetrahydrofuryl-, or (2) substituted heterocyclic groups by substituents such as:

(a) by alkyl groups: e.g. methylpyridyl-;
(b) by halogen: e.g. chloropyridyl-;
(c) by acyloxy groups: e.g. acetoxypyridyl-;
(d) by carbonyl groups: e.g. formylpyridyl-;
(e) by carboxyl groups: e.g. carboxypyridyl-;
(f) by alkoxy groups: e.g. methoxyfuryl-;
(g) by amino groups: e.g. dimethylaminotetrahydrofuryl-;
(h) by sulfo groups: e.g. sulfofuryl-;

(3) Tertiary amines: e.g. triethylamine;
(4) Pyridine-N-oxides: e.g. picoline-N-oxide, etc.;
(5) Heterocyclic compounds: e.g. quinolines, dioxane;
(6) Phosphines, phosphine oxides: e.g. triphenylphosphine, tributylphosphine, triphenylphosphine oxide, tributylphosphine oxide;
(7) Electron donating compounds containing sulfur or oxygen: e.g. ethers, thioethers;
(8) Fluorescent Lewis base: e.g. quinoline, acridine, as well as a fluorescer-substituted tertiaryamine referred to above;
(9) Amine oxides: e.g. trimethylamine oxide, etc.;
(10) Halide group: e.g. chloride, so long as only one of Y or Y' is a halide.

In the above broad generic formula of a typical complex within the scope of this invention, the Y and Y' each before the complex forming reaction are a typical Lewis base.

The process of forming the complex of this invention is typically represented by the reaction of a polycarbonyl dihalide, e.g. oxalyl chloride, with a Lewis base, e.g. pyridine.

The polycarbonyl dihalide may be a compound represented by the general formula:

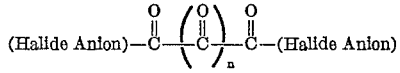

in which $n$ is a number below about 7.

An example of a carbonyl halide-Lewis base complex which typically fails to produce chemiluminescence when reacted with hydrogen peroxide is the acetyl chloride-pyridine complex. Thus, the non-polymer carbonyl halide-Lewis base complex failed.

The polycarbonyl dihalide-Lewis base complex may be formed by the reaction of the polycarbonyl dihalide with a fluorescent or fluorescence producing Lewis-base, e.g. quinoline, acridine and/or may be a fluorescent compound or be capable of producing a fluorescent compound at the time of the chemiluminescent reaction.

The method of synthesizing a typical polycarbonyl dihalide-Lewis base complex and the typical chemical characteristics of the complex are described at length in "Chim. Chronica, 26," 1961, by N. E. Alexandrou, pp. 155–157 inclusive, and in the specific examples below.

If neither the complex nor the Lewis base is (1) a fluorescer, or (2) a fluorescer-producing compound, then it is necessary to employ a fluorescent compound (a fluorescer) in the chemiluminescent reaction to obtain chemiluminescent light.

The peroxide employed in the compositions and process of this invention may be obtained from any suitable peroxidic compound. For example, the peroxide may be employed as sodium peroxide. Alternatively, sodium perborate may be placed in aqueous solution whereby a solution of hydrogen peroxide is obtained. Obviously hydrogen peroxide or its solution may be employed. The presence of water is not necessary in order to obtain the chemiluminescence of this invention, and the peroxide employed preferably is an anhydrous hydrogen peroxide compound such as perhydrate of urea (urea peroxide), perhydrate of pyrophosphate (sodium pyrophosphate peroxide), pyrohydrate of histadiene (histidine peroxide), and the like. Still another form in which the anhydrous $H_2O_2$ may be provided in the composition is that of an anhydrous solution of $H_2O_2$ in a suitable solvent, such as an ether, an ester, an aromatic hydrocarbon, etc., of the type which would provide a suitable diluent for the composition of this invention. Hydrogen peroxide produces the preferred results.

Whenever hydrogen peroxide is contemplated to be employed, any suitable compound may be substituted which will produce peroxide.

Typical diluents within the purview of the instant discovery are those that do not readily react with a peroxide, such as hydrogen peroxide, and which do not readily react with the complex-compound of this invention.

Water is not a necessary reactant in the production of chemiluminescent light in the present invention. Moreover, water cannot be present in large quantities because the water diluent tends to quench the chemiluminescent reaction. However, an inert diluent may contain the water up to about 5%. Any nonreactive diluent may be employed so long as the peroxide employed is at least partially soluble in the diluent, such as, for example, at least one gram of $H_2O_2$ per liter of diluent. By "non-reactive diluent" is meant a diluent which will not react in a manner which will defeat the chemiluminescent reaction. The following are illustrative of the additional diluents or solvents which may be employed: non-cyclic or cyclic ethers, such as diethyl ether, diamyl ether, diphenyl ether, anisole, tetrahydrofuran, dioxane, and the like; esters, such as ethyl acetate, propyl formate, amyl acetate, dimethyl phthalate, diethyl phthalate, methyl benzoate, and the like; aromatic hydrocarbons, such as benzene, xylene, toluene, and the like.

The fluorescent compounds contemplated herein are numerous and they may be defined broadly as those which do not readily react on contact with the peroxide employed in this invention, such as hydrogen peroxide; likewise, they do not readily react on contact with a polycarbonyl dihalide-Lewis base complex. Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted naphthacene, pentacene, substituted pentacene, and the like. Typical substituents for all of these are phenyl, lower alkyl, chlorine, bromine, cyano, alkoxy ($C_1$-$C_{16}$), and other like substituents which do not interfere with the light-generating reaction contemplated herein.

Numerous other fluorescent compounds having the properties given hereinabove are well-known in the art. Many of these are fully described in "Fluorescence and Phosphorscence," by Peter Pringshein, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent complex or fluorescer-producing complex does not require a separate fluorescer.

It has been found that the molar (moles per liter of diluent) concentrations of the major components of the novel composition herein described may vary considerably. It is only necessary that components be in sufficient concentration to obtain chemiluminescence. The complex-compound concentration normally is in the range of at least about $10^{-7}$, preferably in the range of at least about $10^{-4}$ to about 1 molar; the fluorescent compound is present in the range from about $10^{-5}$ to 5, preferably $10^{-4}$ to $10^{-1}$ molar and the diluent employed must be present in a sufficient amount to form a solution of the reactants involved in the chemiluminescent reaction. There is no known maximum limit on the concentration of the complex-compound employed in the reaction.

The chemiluminescent composition of this invention which obtains chemiluminescent light emission upon the admixing of the ingredients of the composition, may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes a complex of this invention and a fluorescer compound, but which does not include a peroxide compound and does not include diluent. Another example would be a composition which includes a complex compound, a fluorescer, a peroxide compound, but which does not include diluent. An alternative composition would be a composition which includes a complex, a fluorescent compound, and a diluent, but which does not include a peroxide compound. Another alternative composition would be a composition which includes the fluorescent compound, a peroxide and a diluent, but which does not include the complex. Obviously, the preferred compositions which would be less than all necessary components to produce a chemiluminescent light, would be a composition which would be substantially stable to a practical degree over an extended period of time; otherwise there would be no real advantage in forming a chemiluminescent reactant to be employed in a subsequent chemiluminescent reaction.

The chemiluminescent reaction process of this invention may be carried out at any temperature below boiling. Temperature is not critical.

The order of addition of the reactants in the chemiluminescent reaction is not critical.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction mixture.

In the practice of the process of this invention to obtain chemiluminescent light, a peroxide such as hydrogen peroxide reacts with the complex of this invention to produce an intermediate compound in which a peroxide group replaces a Y and/or Y' group adjacent to an oxygen-substituted carbon atom, which intermediate compound first may decompose to produce chemiluminescence; or an additional substitution produces a second compound which produces chemiluminescence upon decomposition in the presence of a fluorescer. The mechanism illustrating the chemiluminescent reaction of applicants' invention is represented by the following reaction:

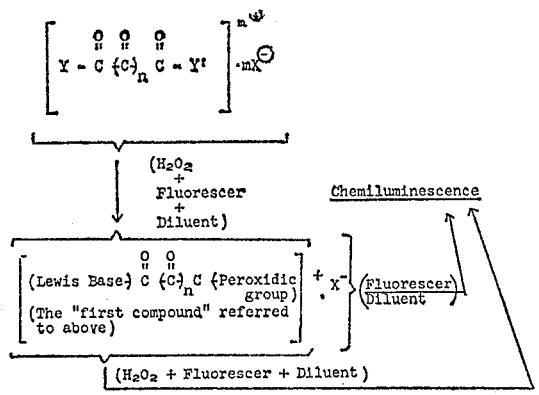

In the above formulae, $n$ is a number less than 7 and $X^-$ is a halide anion.

The singly-substituted "first compound" (above) is a novel compound.

It is clear that no apparent relationships exist in the mechanism of this invention, as represented above and the mechanism of oxalyl chloride reaction as represented by Chandross, discussed above at length.

Although the above reactions are believed to be the mechanism by which applicants' invention produces chemiluminescent light, the invention disclosed herein is not to be restricted to this theory, except as limited in the appended claims.

Pursuant to the present invention disclosed herein, very intense light is generated and the light emissions last anywhere from about 16 to about 60 times longer than that of the art-known aqueous compositions described hereinbefore, such as oxalyl chloride.

The following examples are intended to illustrate the present invention and are in no way intended to limit the invention except as limited in the appended claims.

EXAMPLE 1

First 0.4 ml. water, then approximately 3 mg. oxalyl-chloride-pyridine complex (complex I) is added to a 5 ml. solution of 1 mg. 9,10-diphenyl anthracene in anhydrous petroleum ether. A non-chemiluminescent reaction is observed.

Thus water reacts with complex I in a non-chemiluminescent reaction. Therefore, the presence of large amounts of water is undesirable for the chemiluminescent reaction.

EXAMPLE 2

First, 0.4 ml. anhydrous peroxide, then apppoximately 3 mg. complex I is added to a 5 ml. solution of 1 mg. 9,10-diphenyl anthracene in anhydrous petroleum ether. Strong emission of light is observed on addition of complex I to the reaction mixture.

Chemiluminescence is also observed when perlauric acid or sodium peroxide ($Na_2O_2$) is used in the place of hydrogen peroxide. However, no chemiluminescence is noted when lauroyl peroxide, t-butylhydroperoxide or di-t-butylperoxide is employed in the place of hydrogen peroxide. The anydrous hydrogen peroxide may be replaced by 90% aqueous hydrogen peroxide without a significant decrement of chemiluminescence.

Thus, Example 2 establishes that hydrogen peroxide, perlauric acid and sodium peroxide may be used interchangeably for the chemiluminescent reaction in petroleum ether solvent. However, lauroyl perovide, t-butylhydroperoxide, and di-t-butylperoxide fail to give chemiluminescence in petroleum ether diluent. Further more, it is shown that water in small amounts in the reaction mixture does not defeat the chemiluminescent reaction.

EXAMPLE 3

First, approximately 3 mg. complex I and then 0.4 ml. anhydrous hydrogen peroxide is added to a 5 ml. solution of 1 mg. 9,10-diphenylanthracene in anhydrous petroleum ether. Strong chemiluminescence is observed on addition of hydrogen peroxide to the reaction mixture. Thus, the order of addition of peroxide and the complex is interchangeable and does not effect the chemiluminescent reaction.

EXAMPLE 4

First, 0.4 ml. anhydrous hydrogen peroxide, then approximately 3 mg. complex I is added to a 5 ml. solution of 1 mg. 9,10-diphenylanthracene in anhydrous glyme (1,2-dimethoxyethane). A strong chemiluminescent reaction is observed.

Similar results are obtained when the anhydrous hydrogen peroxide is replaced by a comparable amount of peroxide, such as (1) 90% aqueous hydrogen peroxide, (2) perlauric acid (15 mg.), (3) t-butylhydroperoxide or (4) sodium peroxide.

Thus, a chemiluminescent reaction is obtained in anhydrous glyme solvent with all peroxides employed, even with t-butylhydroperoxide (which fails to give a chemiluminescent reaction in hydrous petroleum ether).

EXAMPLE 5

First, 0.4 ml. anhydrous hydrogen peroxide, then approximately 3 mg. oxalyl chloride-tri-n-butylphosphine complex (complex II) is added to a 5 ml. solution of 1 mg. 9,10-diphenylanthracene in anhydrous glyme. A strong chemiluminescent reaction is observed.

Chemiluminescence is observed when the anhydrous hydrogen peroxide is replaced by 90% aqueous hydrogen peroxide, perlauric acid or t-butylhydroperoxide. However, no chemiluminescence is obtained when sodium peroxide or di-t-butyl peroxide is used as peroxide.

Thus, complex II produces chemiluminescence in a reaction with hydrogen peroxide, perlauric acid or t-butyl peroxide but not with sodium peroxide or di-t-butyl peroxide.

EXAMPLE 6

First, 0.4 ml. anhydrous hydrogen peroxide, then approximately 3 mg. oxalyl chloride-triphenylphosphine (1:1) complex (complex III) is added to a 5 ml. solution of 1 mg. 9,10-diphenylanthracene in glyme. A strong chemiluminescent reaction is observed.

Chemiluminescence is also observed when the anhydrous hydrogen perovide is replaced by 90% aqueous hydrogen peroxide, perlauric acid, sodium peroxide, t-butyl hydroperoxide, di-t-butyl peroxide.

Thus, complex III produces chemiluminescence in a reaction with hydrogen peroxide, perlauric acid, sodium peroxide, t-butyl hydroperoxide, di-t-butyl peroxide.

EXAMPLE 7

Approximately 3 mg. of complex II or complex III is dissolved in 5 ml. of anhydrous glyme. The solution is maintained at room temperature for ½–1 hour. Then the addition of 3 ml. of a solution of 0.2 ml. anhydrous hydrogen peroxide in glyme resulted in a strongly chemiluminescent reaction.

Thus, the order of addition of the reactants is not critical.

EXAMPLE 8

Reaction of the pyridine-oxalyl chloride complex with several peroxides in the presence of a fluorescer was found to generate chemiluminescence as indicated in Table I.

TABLE I.—OXALYL CHLORIDE-PYRIDINE COMPLEX PEROXIDE SYSTEM

| Solvent | Co-reactant | Temp., degree | Atmosphere | Chemiluminescence intensity |
|---|---|---|---|---|
| Tetrahydrofuran | $H_2O$ | 25 | Air | None. |
| Do | $H_2O_2$ (30%) | 25 | Air | M. |
| Ether | Peroxylauric acid | 25 | Argon | MW. |
| Pet. ether | Peroxybenzoic acid | −70 | do | None. |
| Pet. ether | do | 0 | do | Do. |
| Pet. ether | do | 25 | do | VW. |
| Ether | do | 25 | do | W. |
| Do | do | −70 | do | VW. |
| Do | 9,10-diphenylanthracene photooxide | 25 | do | None. |
| Ether (no fluorescer) | do | 25 | do | Do. |

NOTE.—Approximately 2-3 mg. of the complex was added to a solution of 1 mg. 9,10-diphenylanthracene and about 5 mg. of co-reactant in 5 ml. solvent maintained at the desired temperature. Chemiluminescence was observed visually. Classification is based on oxalyl chloride-hydrogen peroxide taken as strong(S). Other designations are M=medium, W=weak, VW=very weak, barely visible.

Reaction of the complex with water is vigorous but non-chemiluminescent. Reaction with hydrogen peroxide, however, provides a medium intensity emission. Reactions with peroxylauric and peroxybenzoic acids produced evident but less intense emissions, which are temperature dependent.

EXAMPLE 9

This example illustrates reactions of additional oxalyl chloride complexes. The results are shown in Table II.

TABLE II.—CHEMILUMINESCENCE OF THE LEWIS BASE-OXLYL CHLORIDE SYSTEM

| | Complex | | | | |
|---|---|---|---|---|---|
| | A | B | C | | |
| Order of addition to solvent | Petroleum ether | Glyme | Glyme | Petroleum ether | Glyme |
| 1. Water / 2. Complex | None | | | | None. |
| 1. Anhydrous $H_2O_2$ / 2. Complex | S | S | MS | MS | MS. |
| 1. 90% $H_2O_2$ / 2. Complex | S | S | MS | MS | MS. |
| 1. Peroxybenzoic acid / 2. Complex | None | | | | |
| 2. Benzoyl peroxide / 1. Complex | do | | | | |
| 1. Peroxylauric acid / 2. Complex | VW | VW | VW | W | VW. |
| 1. t-Butyl hydroperoxide / 2. Complex | None | VW | VW | VW | None. |
| 1. di-t-Butyl peroxide / 2. Complex | None | | None | | |
| 1. $Na_2O_2$ / 2. Complex | VW | W | do | W | |
| 1. Complex / 2. Anhydrous $H_2O_2$ | S | | | | |

Complex A:

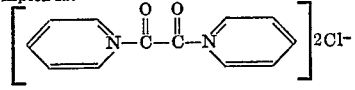

Complex B:

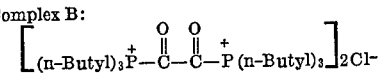

Complex C:

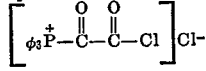

NOTE.—Test were carried out in the following manner. To 5 ml. of the test solvent containing 1 mg. 9, 10-diphenylanthracene was added approximately 15 mg. peroxide and approximately 3 mg. of complex.

The following examples illustrate the preparation of oxalyl chloride complexes of the present invention.

EXAMPLE 10

Pyridine-oxalyl chloride complex (2:1)

A solution of 0.6 g. (0.005 mole) of oxalyl chloride in 25 ml. dry petroleum ether was added dropwise with stirring to 0.8 g. (0.01 mole) pyridine in 25 ml. dry petroleum ether at 25°. The reaction was protected from moisture with a "Drierite" drying tube.

The yellow precipitate, which formed immediately during addition, was filtered under nitrogen, washed with petroleum ether, and dried under vacuum to obtain 1.0 g. (71.4%) of product, M.P. 118.5–120.0°; resolidification, then partial melting 140–42°.

*Elementary analysis.*—Calculated (percent): C, 50.54; H, 4.35; N, 9.83; Cl, 24.87. Obtained: (percent): C, 50.91; H, 3.53; N. 9.72; Cl, 24.66.

EXAMPLE 11

Peroxylauric acid

To a slurry of 30 g. (0.15 mole) of lauric acid in 72 g. (0.75 mole) of methanesulfonic acid at 40°, was added 16.6 g. (0.45 mole) of 90% hydrogen peroxide during 20 minutes. The temperature was maintained at 40° with stirring for 40 minutes. Then crushed ice was added slowly to the reaction mixture maintaining the temperature 25°. The mixture was filtered, and the collected material washed well with cold water and dried under vacuum to obtain 34.8 g. (100%) of peroxyacid, M.P. 50–51°. The product was crystallized from petroleum ether.

EXAMPLE 12

2:1 tributylphosphine-oxalyl chloride complex

A solution of 1.0 g. (0.005 mole) of tributylphosphine in 25 ml. dry petroleum ether was added during 10 minutes to a stirred solution of 0.3 g. (0.0025 mole) of oxalyl chloride in 25 ml. dry petroleum ether at 0° under argon. The reaction mixture was stirred ½ hour, then the solvent was removed under vacuum (without applying external heat) to obtain approximately 1.0 g. (77%) of yellow, semi-solid product whose infra-red spectrum is in agreement with that expected for the desired product.

EXAMPLE 13

1:1 triphenylphosphine-oxalyl chloride complex

A solution of 0.3 g. (0.0025 mole) of oxalyl chloride in 50 ml. dry petroleum ether was added during 15 minutes to a stirred solution of 1.3 g. (0.005 mole) of triphenylphosphine in 100 ml. dry petroleum ether at 0° under argon. The reaction mixture was stirred 1 hour, then the precipitated material was collected by filtration to obtain 0.7 g. (43.7%) of product, whose infra-red spectrum is in agreement with that expected for the 1:1 complex of triphenylphosphine and oxalyl chloride.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container or (1) insoluble or (2) dissolvable capsule in which the reactant of this invention is enclosed for subsequent reaction with the other ingredients necessary to produce chemiluminescent energy and light.

What is claimed is:

1. A compound of the formula:

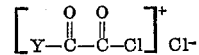

in which Y is a group selected from the group consisting of tributylphosphine and triphenylphosphine groups.

2. An oxalic acid halide-triphenylphosphine complex according to the formula of claim 1.

3. An oxalic acid halide-tributylphosphine complex according to the formula of claim 1.

References Cited

J. H. Simons: Fluorine Chemistry, vol. I, pages 402–3 (1950) QD181 F1548.

LORRAINE A. WEINBERGER, Examiner

E. J. GLEIMAN, Assistant Examiner

U.S. Cl. X.R.

260—279 R, 287 R, 294.8 R, 295 R, 296 R, 296 A, 297 R, 340.7, 347.3, 347.8, 469, 515 R, 544 Y, 561 R, 590, 592, 593 R, 606.5 P